May 26, 1964   J. R. BLAKELY   3,134,187
FISHING SIGNAL DEVICE
Filed July 16, 1962   2 Sheets-Sheet 1
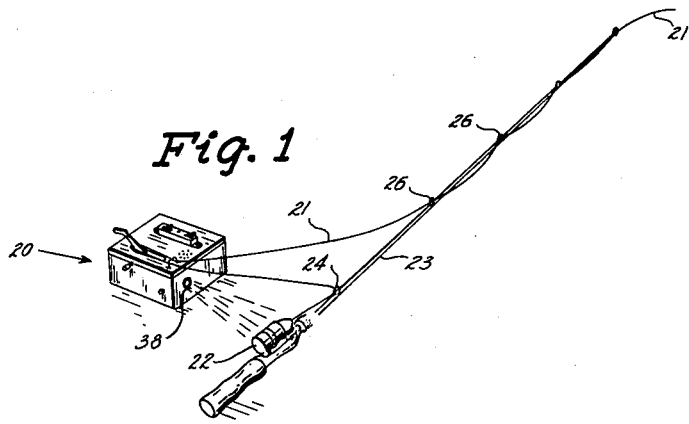
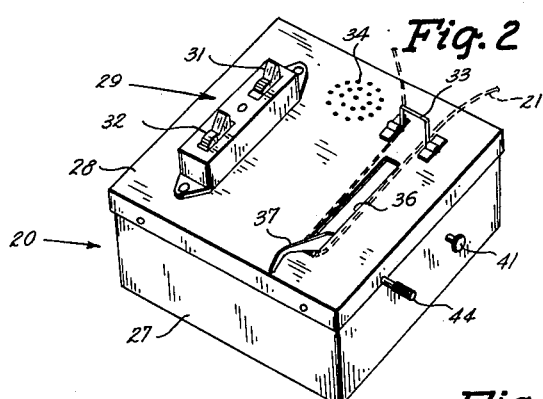
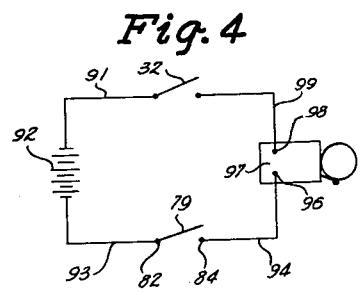
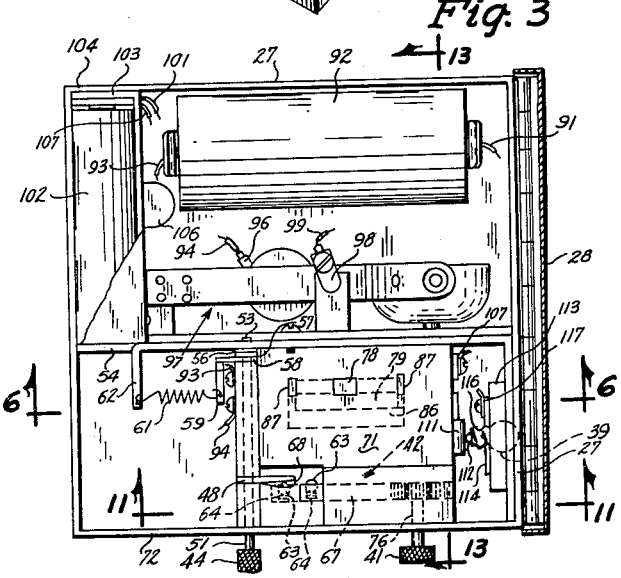
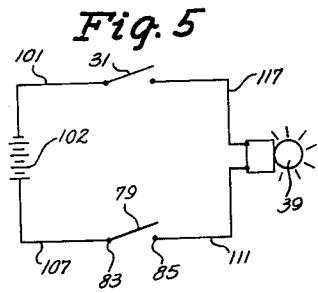
INVENTOR
JAMES R. BLAKELY
BY
ATTORNEYS May 26, 1964  J. R. BLAKELY  3,134,187
FISHING SIGNAL DEVICE
Filed July 16, 1962  2 Sheets-Sheet 2
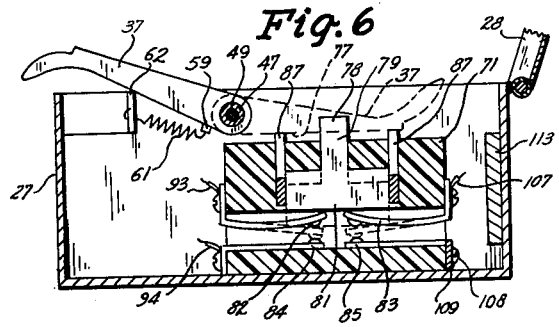
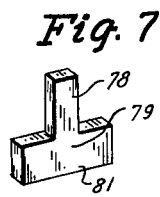
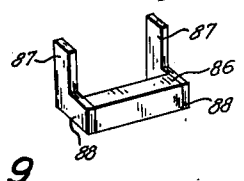
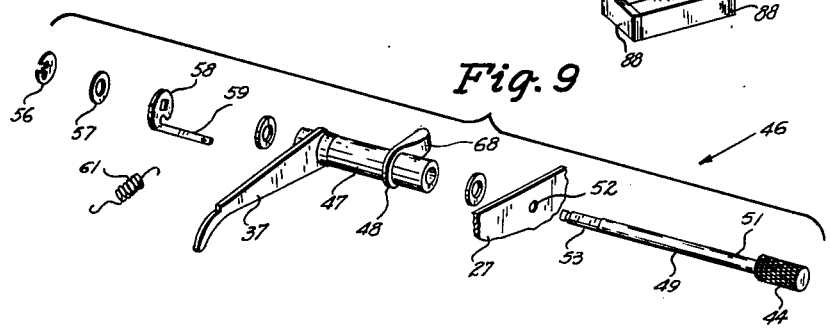
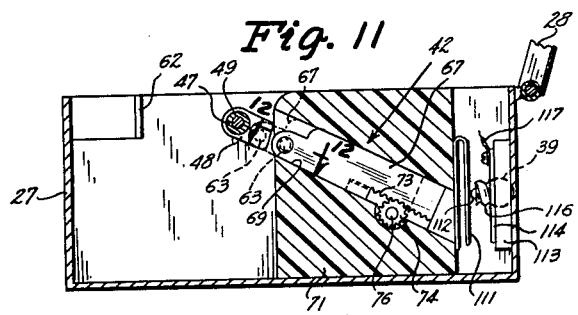
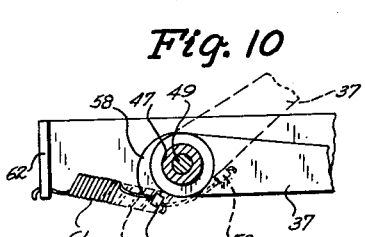
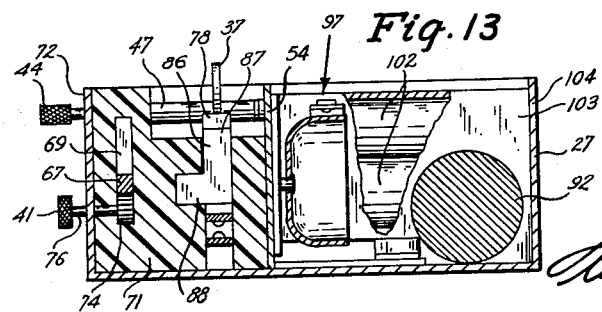
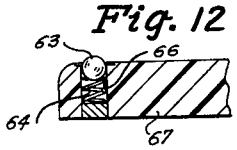
INVENTOR
JAMES R. BLAKELY
ATTORNEYS United States Patent Office 3,134,187
Patented May 26, 1964

1

3,134,187
FISHING SIGNAL DEVICE
James R. Blakely, 400 New York Ave., Creston, Iowa
Filed July 16, 1962, Ser. No. 210,139
2 Claims. (Cl. 43—17)

This invention relates generally to a signal device, and more particularly to a signal device adapted to signal by visual and audible means that a fish is caught on a line.

It is an object of this invention to provide an improved signal device adapted particularly for use with a fishing pole and line to indicate that a fish is pulling on the line.

Another object of this invention is to provide a signal device as characterized above which may be placed at any convenient location near the pole and in non-interfering contact with the line.

A further object of this invention is to provide such a signal device which incorporates both a visual signal and an audible signal, usable either separately or simultaneously.

Yet another object of this invention is the provision of a signal device as characterized above wherein the fishing line is frictionally held by a trigger movable by a pull upon the line to close a signal-producing circuit, and wherein the trigger is magnetically held in the tripped position for insuring a positively closed circuit.

It is another object of this invention to provide in such a signal device a trigger which is positively held in a closed circuit, signal-producing position completely recessed in a case, and wherein the amount of friction necessarily overcome in tripping the trigger due to the pull of the line can be readily varied and adjusted.

A further object of this invention is to provide a signal device capable of attaining the above mentioned objectives which is economical to manufacture, efficient in use, and easily serviced.

These objects, and other features and objects of this invention will become readily apparent upon reference to the following description and the accompanying drawings, wherein:

FIG. 1 is a perspective view of my improved signal device shown in operative engagement with the line of a fishing pole;

FIG. 2 is an enlarged perspective view of my signal device in a cocked position with the fishing line shown in dotted lines;

FIG. 3 is a further enlarged top plan view of the signal device of this invention with the cover removed, certain parts shown in dotted lines and others broken away for clarity of invention;

FIG. 4 and FIG. 5 are wiring diagrams for the audible and visual signaling circuits, respectively.

FIG. 6 is a sectional view taken along line 6—6 in FIG. 3, and showing the trigger in alternate positions;

FIGS. 7 and 8 are detail views of a pair of elements of a magnetic switch incorporated in the signal device;

FIG. 9 is an exploded view of the elements of a unit for returning the trigger from a tripped operative position to a cocked, inoperative position;

FIG. 10 is an enlarged fragmentary view of a detail area from FIG. 6 and showing different positions of the trigger and the trigger moving unit;

FIG. 11 is a sectional view taken along line 11—11 in FIG. 3;

2

FIG. 12 is a further enlarged, fragmentary sectional view taken along line 12—12 in FIG. 11; and FIG. 13 is a sectional view taken along line 13—13 in FIG. 3, certain parts broken away for clarity of illustration.

Referring now to the drawings, my signal device is indicated generally at 20 in FIG. 1 and is shown connected to a fishing line 21. The line 21 runs from a reel 22 mounted on a pole 23 through at least one eyelet 24 before extending over to the signal device 20 and then is threaded through the remaining eyelets 26 on the pole 23. As will be described in more detail hereinafter, movement of the line 21 away from the reel 22 due to the pull of a fish hooked on the line causes the line 21, in straightening out, to actuate the signal device whereby either an audible buzzer or a visual light, or both, are energized and operated.

More particularly, the signal device of this invention comprises a case 27 (FIGS. 2 and 3) having a cover 28 hingedly connected thereto. The cover 28 has a switch unit 29 mounted thereon which includes a pair of separate switches 31 and 32, a U-shaped bail 33 through which the line 21 is threaded, a circular series of perforations 34 through which the sound of a buzzer (not shown) can be heard, and a slot 36 for accommodating the pivotal movement of a trigger 37. The case 27 is completely enclosed about the sides and bottom except for an opening 38 (FIG. 1) for a light bulb 39 (FIG. 3), and a pair of openings for a knob 41 (FIGS. 2 and 3) for the friction or drag adjusting unit 42 (FIGS. 3 and 11) with respect to movement of the trigger 37, and for another knob 44 for the trigger return unit 46 (FIGS. 3, 9 and 10).

The trigger 37 (FIGS. 2 and 9) is integral at one end with a sleeve 47 which is part of the trigger return unit 46. At one end of the sleeve 47 opposite the trigger 37, an arm 48 is extended for coaction with the drag adjusting unit 42. The sleeve 47 is rotatably mounted on an elongated shaft 49, one end 51 (FIG. 9) of which is inserted through an opening 52 in the case 27 for attachment to the knob 44, and the other squared end 53 (FIG. 3) of which is journalled into an inner partition 54 of the case.

A lock washer 56 and a regular washer 57 are inserted on the squared end 53 of the shaft 49, along with an actuator washer 58 having a finger 59 (FIGS. 9 and 10) extended longitudinally of and parallel to the shaft 49. The finger 59 extends beneath and beyond the trigger 37, so that upon rotative movement of the actuator washer 58, due to rotation of the shaft 49, in a counterclockwise direction (FIG. 10), the finger 59 engages and rotates the trigger 37 also in a counterclockwise direction.

It will be noted that the trigger 37 in FIG. 6 is shown in its cocked, inoperative position in full lines, wherein a portion thereof extends through the slot 36 (FIG. 2) above the cover. Upon being pulled by the line 21, the trigger is moved to the tripped, operative position as shown in dotted lines in FIG. 6, and as shown fragmentarily in full lines in FIG. 10. As the actuator finger 59 rotates the trigger 37 from its tripped position toward its cocked position, as shown in dotted lines in FIG. 10, a spring 61 connected between a partition bracket 62 (FIGS. 3 and 6) and the finger 59, is stretched until the finger 59 is stopped, whereupon the spring 61 acts to return the finger 59 and its actuator washer 58 to their normal position as indicated in full lines in FIG. 10.

To provide a variable drag on the movement of the trigger 37, the arm 43 (FIG. 11) integral therewith is engaged, when the finger 59 is in its normal position (FIG. 6), with a ball 63 (FIGS. 11 and 12) mounted under the tension of a spring 64 in a recess 66 formed in a slide member 67. As the tip 68 of the arm 48 has an inclined surface engageable by the ball 63, it may readily be seen that movement of the slide 67 relative to the arm 48 in a manner to compress the ball 63 against the spring 64 to a greater degree provides for a greater frictional drag on movement of the arm 48, and thus on movement of the sleeve 47 and the trigger 37. Likewise, movement of the slide 67 in a manner to relieve the compression on the spring 64 provides a lesser degree of frictional drag on the arm 48.

The slide 67 is slidably mounted in an inclined recess 69 (FIGS. 11 and 13) provided in a block 71 of insulating material mounted in the case 27 between one wall 72 of the case 27 and the partition 54. Serrated teeth 73 are formed on the underside of the slide 67 and are in engagement with a rotatable wheel 74 mounted on the inner end of a shaft 76, the outer end of which is secured to the knob 41. Thus rotation of the knob 41 in either direction results in movement of the slide 67 either toward or away from the arm 48, thereby effecting either an increased or a decreased compression of the spring-biased ball 63 against the arm 48. The frictional drag upon movement of the trigger 37 is therefore adjustable.

When the trigger 37 is pulled by the fishing line 21 to the tripped position, as shown in dotted lines in FIG. 6, its lower flat surface 77 engages the upper end 78 of a switch actuator 79 (FIG. 7), mounted for vertical movement in the block 71. The lower end 81 of the switch actuator 79 is engageable with a pair of spring-type leaf contacts 82 and 83, normally spaced from but engageable with, due to downward movement of the actuator 79, another pair of contacts 84 and 85, respectively. The trigger 37, comprised of a metallic material is positively held in the tripped, operative dotted line positions of FIG. 6 by a U-shaped magnet 86 (FIGS. 6 and 8) the upper ends 87 of which are engageable with to attract and to hold the trigger 37 along its lower surface 77. The magnet 86 is also mounted within the block 71, in a stationary manner due to interconnected legs 88 (FIG. 13) thereof inserted in cavities provided therefor in the block 71.

The contacts referred to in the last paragraph, along with the earlier mentioned switches 31 and 32 (FIG. 2) are all parts of a pair of separate circuits, both of which can be operated simultaneously. Referring primarily to FIGS. 3, 4 and 6, the circuitry and electrical components for an audible signal system are shown. From the switch 32, one line 91 leads to one end of a battery 92 secured within the case 27, and from the other end of the battery 92 another line 93 leads to the leaf contact 82 mounted at one end on the block 71 (FIG. 6). The audible circuit is completed by the contact 84 being connected by a line 94 which leads to one side 96 (FIG. 3) of a standard buzzer unit 97, the other side 98 of which is connected by a lead 99 to the cover switch 32.

Referring to FIGS. 3, 5 and 6, the circuitry and electrical components for a visual signal system are shown. From the switch 31, one line 101 leads to a pair of flashlight batteries 102 mounted in series within a bracket 103 secured within the case 27 between the partition 54 and another case wall 104. A lip 106 is formed on the bracket 103 to aid in its being lifted out for changing the batteries 102. The battery 92 could be an Eveready Series D, whereas the batteries 102 could be Eveready Series AA.

From the batteries 102 a line 107 leads to the leaf contact 83. However, the contact 85 is connected, by a screw 108 (FIG. 6) to the base 109 of another leaf contact 111 (FIG. 11). As best shown in FIGS. 3 and 11, the contact 111 is frictionally engageable by the tip 112 of the light bulb 39 which is threaded through a housing 113 secured to the case 27. A conductive plate 114 secured to the housing 113 contacts the metal shell 116 of the bulb 39 and is connected by a lead 117 back to the cover switch 31.

From the arrangement of the audible circuit of FIG. 4, and the visual circuit of FIG. 5, it can readily be seen that should both switches 32 and 31 be closed, upon the trigger 37 being moved by the fishing line 21 toward the switch actuator 79 (FIG. 6) so as to move the actuator and simultaneously close the contacts 82 and 83 with 84 and 85, respectively, both circuits will be energized, whereupon the buzzer unit 97 will buzz, and the light bulb 39 will glow.

Should, for example, it be not desirable to energize the light bulb 39, by merely leaving the cover switch 31 open, movement of the actuator switch 79 to effect a closing of the circuits will not so effect the light bulb circuit. The same result would hold true for the buzzer circuit, should the cover switch 32 be left upon.

In summation, my signal device is embodied in a structure which can be located and placed apart from the pole, which provides a trigger having an adjustable drag thereon for effecting the actuation of either one or both of an audible signal and a visual signal; and further wherein my trigger is adapted to be attracted to and positively held in a completely recessed position during actuation thereby of a switch.

Some changes may be made in the construction and arrangement of my fishing signal device without departing from the real spirit and purpose of my invention, and it is my intention to cover by my claims, any modified forms of structure or use of mechanical equivalents which may be reasonably included within their scope.

I claim:

1. A signal device adapted for connection with a fishing line mounted on a fishing pole comprising in combination:
    a housing having a slot formed therein;
    a trigger pivotally mounted in said housing with a portion thereof extended through said slot when said trigger is in an inoperative position, said portion engageable by the line, said trigger movable from said inoperative position to an operative position in response to a pull on said line against said portion;
    means inserted through said housing and frictionally engageable with said trigger, said means adjustable to vary the amount of said frictional engagement;
    means rotatably inserted in said housing and adapted to retractably engage said trigger and to pivot said trigger toward said inoperative position with said portion extended from said housing;
    spring means operatively engaged to and extended between said rotatably inserted means and said housing to bias said rotatably inserted means away from said trigger; and
    electrically operable signal means mounted within said housing and operated in response to movement of said trigger to engagement thereof by said trigger upon its operative position.

2. A signal device adapted for connection with a fishing line mounted on a fishing pole comprising in combination:
    a substantially closed housing separate from the pole and having a slot formed therein;
    means including a trigger extended from said housing and engageable with the line, said trigger movable in response to a pull upon the line from an inoperative position against said housing at one end of said slot, through said slot to an operative position below said slot and within said housing;
    a battery-powered, normally open, first electric circuit mounted within said housing;
    an audible signal device interposed in said first circuit and operable upon closing said first circuit;
    a battery-powered, normally open, second electric circuit mounted within said housing;
    a visual signal device interposed in said second circuit and operable upon closing thereof;

a first pair of independently operable switches mounted on said housing, each switch interposed in a respective circuit, a second pair of switches mounted within said housing and engageable by said trigger in said operative position and operable, when either of said first pair of switches is closed, in response to movement of said trigger to said operative position to close the respective circuit of said closed first pair switch.

References Cited in the file of this patent

UNITED STATES PATENTS

| | | |
|---|---|---|
| 522,352 | Poppowitsch | July 3, 1894 |
| 1,737,921 | Derr | Dec. 3, 1929 |
| 2,449,109 | Domonkas | Sept. 14, 1948 |
| 2,556,628 | Nisle | June 12, 1951 |
| 2,679,036 | Vasek | May 18, 1954 |
| 2,978,828 | McQuiston et al. | Apr. 11, 1961 |
| 2,995,853 | Ohliger | Aug. 15, 1961 |
| 3,074,196 | Bronson | Jan. 22, 1963 |